United States Patent
Lee

(10) Patent No.: US 10,329,062 B2
(45) Date of Patent: Jun. 25, 2019

(54) MULTI-DIRECTION ZIP-TIE

(71) Applicant: Seo Joon Lee, Austin, TX (US)

(72) Inventor: Seo Joon Lee, Austin, TX (US)

(*) Notice: Subject to any disclaimer, the term of this patent is extended or adjusted under 35 U.S.C. 154(b) by 257 days.

(21) Appl. No.: 15/334,794

(22) Filed: Oct. 26, 2016

(65) Prior Publication Data

US 2018/0111730 A1    Apr. 26, 2018

(51) Int. Cl.
*B65D 63/10* (2006.01)
*E04H 9/00* (2006.01)
*F16B 2/00* (2006.01)

(52) U.S. Cl.
CPC .......... *B65D 63/1063* (2013.01); *E04H 9/00* (2013.01); *B65D 2563/108* (2013.01); *F16B 2/00* (2013.01)

(58) Field of Classification Search
CPC ............... B65D 63/1063; B65D 2563/108; E04H 9/00; F16B 2/00
See application file for complete search history.

(56) References Cited

U.S. PATENT DOCUMENTS

| | | | | | |
|---|---|---|---|---|---|
| 3,461,510 | A | * | 8/1969 | Holmes | B65D 63/1063 24/16 PB |
| 3,739,429 | A | * | 6/1973 | Kohke | B65D 63/1054 24/16 PB |
| 4,752,054 | A | * | 6/1988 | Jonsson | F16L 3/01 24/16 PB |
| 6,364,257 | B1 | * | 4/2002 | Holder | F16L 3/2336 24/16 PB |
| D714,632 | S | * | 10/2014 | Pando | D8/356 |
| 10,029,835 | B1 | * | 7/2018 | Cuddy | B65D 63/1027 |
| 2002/0104196 | A1 | * | 8/2002 | Geiger | B65D 63/1072 24/16 PB |

* cited by examiner

*Primary Examiner* — Robert Sandy
*Assistant Examiner* — Louis A Mercado
(74) *Attorney, Agent, or Firm* — Saliwanchik, Lloyd & Eisenschenk

(57) ABSTRACT

A multi-direction zip-tie includes a first zip-tie having a first fastener and a first strap integral therewith, and a second zip-tie having a second fastener and a second strap. The second strap can be integral with a head that engaged with a groove in the second fastener, making the second strap interchangeable. The first fastener and the second fastener are configured to be rotatably engaged with each other by a first ratchet structure. The first zip-tie can have a third strap integrally connected to the first fastener. An extension strap can be engaged with one of the first, second, and third straps to add length. The ability of the first fastener and second fastener to rotate relative to each other allows the straps to be placed in the most advantageous position for connecting and securing materials.

16 Claims, 16 Drawing Sheets

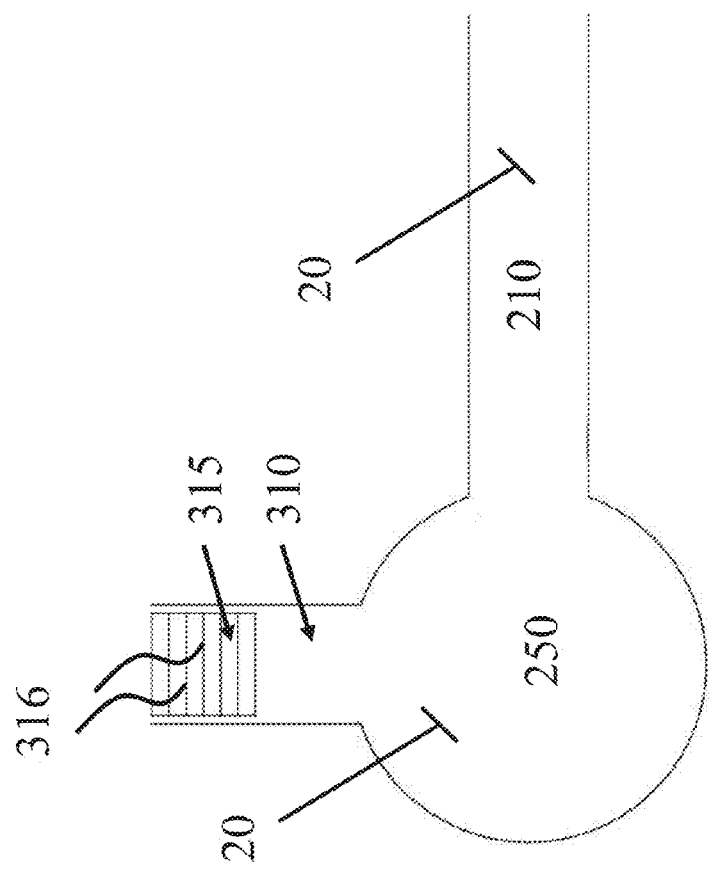
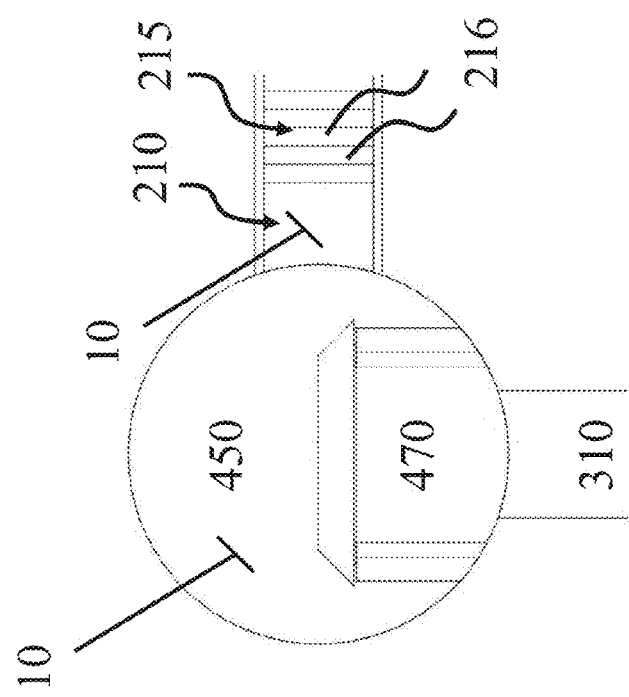
FIG. 6(b)
FIG. 6(a)

MULTI-DIRECTION ZIP-TIE

BACKGROUND

Many natural disasters, such as earthquakes and cyclones, occur unexpectedly and leave many victims. One of the most important and urgent issues after a natural disaster is the need for shelter that the victims live in for long periods of time. However, the shelters typically available are often too large to deliver to the disaster area. Shelter kits can provide a feasible and inexpensive alternative to larger shelter structures, and a variety of shelter kits are available for use in disaster areas. Though shelter kit structures are usually small, they are not easy to build and, in some situations, it can take several days to assemble one. Oftentimes, the reason for the extensive assembly time is the type of apparatuses used to secure the components of the structure. Thus, the victims are forced to live outside during the construction of the shelter. Ideally, any temporary shelter should be strong enough to house and provide support to the victims and their supplies. There is a need for a quick and easy device that can be used to securely assemble a disaster shelter.

BRIEF SUMMARY

Embodiments of the present invention relate to fastening devices, more particularly, to multi-direction zip-ties to securely fasten objectS and materials. Universal attachment devices, such as those of embodiments of the subject invention, can be particularly advantageous for disaster shelters, as they can allow for the attachment and assembly of materials that may already be available in a disaster area.

In accordance with embodiments of the subject invention, the problem of securely connecting materials of varying shape and size is solved by a multi-direction zip-tie connector with several straps capable of attachment in multiple directions. The straps of the zip-tie extend from and can be secured to fasteners that can rotate to position the multiple straps therein in the most advantageous position for attaching materials. Embodiments of zip-ties of the subject invention successfully address the above disadvantages of the previously known devices and methods and provide one or more advantages not realized by these previously known devices and methods. In particular, embodiments of the subject invention provide novel, inexpensive, and highly effective zip-tie fastener devices for securely connecting several materials. In particular, the ability of the zip-ties of embodiments of the subject invention to secure materials in multiple directions makes them universally usable and particularly suited for building three-dimensional structures, such as temporary shelters.

In one embodiment, a multi-direction zip-tie includes a first zip-tie with a first fastener and a first strap integral (or monolithic) with and extending from the first fastener and a second zip-tie with a second fastener and a second strap extending from the second fastener, wherein the first fastener and the second fastener are configured to be rotatably attached, such that their respective straps can be turned relative to each other. Additional straps can be attached to each fastener.

In a further embodiment, the first zip-tie includes another strap integral (or monolithic) with and extending from the first zip-tie and in a different direction than the first strap. The straps on each fastener can be sufficiently flexible to be wrapped or looped around a material and the strap end brought into contact with the fastener. A fastener can include one or more features or structures capable of securing the strap to the fastener. In one embodiment, a fastener includes a channel through which the strap can pass and be secured by structures therein. In one embodiment, there is a pawl with at least one tooth thereon operably positioned within each channel and a plurality of ridges on each strap configured to operably engage with the at least one tooth to secure the strap when it is passed through the channel. In a specific embodiment, the straps are configured so that their respective channels cross each other, such that the straps cross each other when secured in the channels.

The straps can all be the same length or have different lengths. It can be helpful if the length of the straps can be determined as needed and, if necessary, adjusted or changed to suit the situation and the particular materials being connected. In one embodiment, the second fastener includes a groove in which a head can be seated and removably secured. The head can have an integral (or monolithic) strap extending therefrom and a channel having structures therein for securing the strap when the end is looped back around. In a specific embodiment, the head has a pawl with at least one tooth and the second strap has a plurality of ridges that can engage with and be secured in place by the at least one tooth. There can be different lengths of second straps each connected to a head. To change the length of the strap, the head can be removed from the groove and a different head with a different length strap can be seated and removably secured to the groove.

Advantageously, the head can be used independent of the second fastener and the groove, whereby the head can be attached to another strap, so that the ridges on the other strap engage with the pawl in the channel of the head. In this embodiment, the head and strap can be used as an extension strap, for lengthening another strap.

The multi-direction zip-ties of embodiments of the subject invention can be particularly suited for connecting or joining non-standard size materials. The ability to extend the length of a zip-tie strap utilizing an extension strap allows for the joining or connection of larger materials or can allow the straps to be used for reinforcement or support. The universality of the zip-ties makes them particularly suited for use in constructing three-dimensional structures, such as shelters and covers by utilizing a variety of readily available materials. This can be beneficial in disaster areas where standard materials may be lacking or difficult to obtain. The zip-ties of embodiments of the subject invention can be used to quickly build structures from existing, non-uniform, or non-standard size materials.

BRIEF DESCRIPTION OF THE DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 2(a) shows the first fastener and the second fastener with unattached ratchet structures. FIG. 2(b) shows the first fastener and second fastener with their ratchet structures engaged to secure the fasteners together.

FIG. 3(a) shows the head unattached to the second fastener. FIG. 3(b) shows the head affixed to the second fastener.

FIGS. 6(a) and 6(b) show a top view and a bottom view, respectively, of a multi-direction zip-tie, according to one embodiment of the subject invention.

FIG. 9(a) is a perspective view of the first fastener and FIG. 9(b) is a rear side elevation view of the first fastener.

FIG. 11(a) is a bottom front side view. FIG. 11(b) is a right side elevation view.

FIG. 12(a) shows the first fastener, second fastener and head detached. FIG. 12(b) shows the first fastener and second fastener attached and the head detached.

FIG. 16(a) illustrates an example of how the straps are configured when the distal ends are affixed within the respective channels in the fasteners. FIG. 16(b) illustrates a multi-direction zip-tie being used to connect two materials.

DETAILED DISCLOSURE

Figure 1:
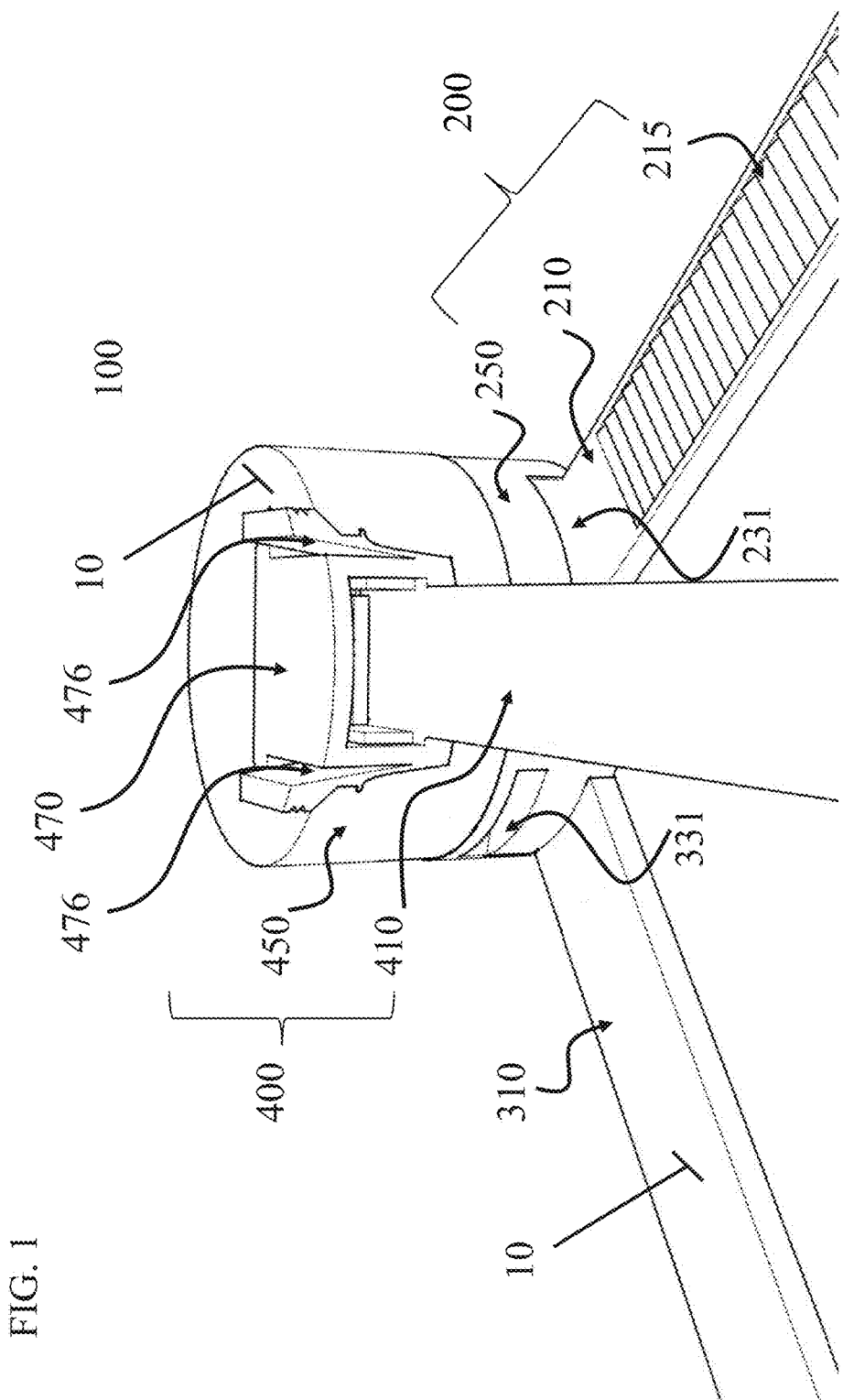
FIG. 1 is a perspective front view of a multi-direction zip-tie according to an embodiment of the subject invention.

Embodiments of the subject invention provide devices that can be used to connect or attach materials, particularly irregular or non-standard size materials. More specifically, embodiments of the subject invention provide multi-direction zip-ties, or similar devices, capable of being used to assemble three-dimensional structures.

The following description will disclose that embodiments of the subject invention are particularly useful for the attaching materials of non-uniform or irregular shape, in particular for the construction of temporary buildings or structures. A specific use would be the construction of shelters, storage buildings, pens, and other structures using embodiments of the subject invention to attach residual materials that often exist in zones of destruction or natural disaster. However, a person with skill in the art will be able to recognize numerous other uses that would be applicable to the devices and methods of embodiments of the subject invention. Modifications that would be apparent to a person with skill in the art and having benefit of the subject disclosure are contemplated to be within the scope of the present invention.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Reference will be made to the attached figures on which the same reference numerals are used throughout to indicate the same or similar components. With reference to the attached figures, which show certain embodiments of a the subject invention, it can be seen in FIG. 1 that, in an embodiment, a multi-direction zip-tie 100 includes a first zip-tie 200 having a first fastener 250 and having a first strap 210 that can be integral (or monolithic) therewith and extending from the first fastener. A second zip-tie 400 can have a second fastener 450 capable of being rotatably attached to the first fastener. The second fastener can have a groove 460 in which a head 470 can be engaged, where the head has a second strap 410 integral (or monolithic) therewith and extending therefrom. When the first fastener, second fastener, and head are all engaged, the one or more straps can radiate outward from the fasteners. There can also be multiple channels in which the straps on each fastener can be engaged and secured, such that the straps can form adjustable loops.

Figure 2B:
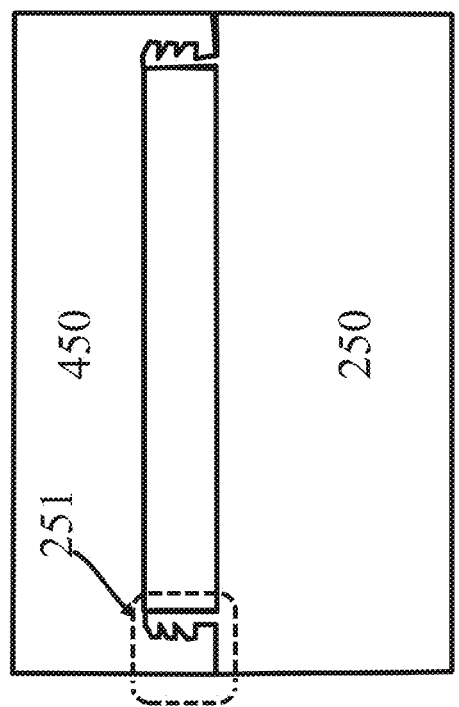
FIGS. 2(a) and 2(b) are schematic diagrams of a first ratchet structure of a multi-direction zip-tie, according to one embodiment of the subject invention.
Figure 2A:
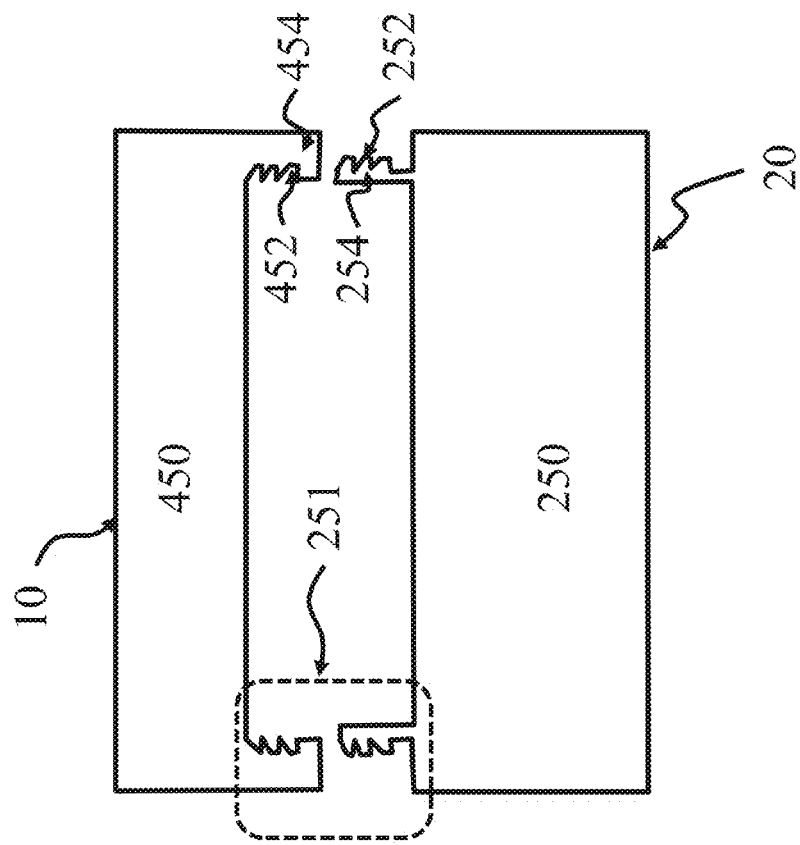

FIG. 2 is a schematic diagram of an embodiment of a first ratchet structure 251 that can be used with a multi-direction zip-tie 100. Referring to FIG. 2, it can be seen that with this embodiment, the first fastener 250 of the first zip-tie 200 and the second fastener 450 of the second zip-tie 400 can be combined with each other by a first ratchet structure 251. The first fastener 250 can include a first engaging tooth 252 located on a first pawl 254, and the second fastener 450 can include a second engaging tooth 452 located on a second pawl 454. The first ratchet structure 251 is formed between the first fastener and the second fastener by operably connecting the first engaging tooth 252 and the second engaging tooth 452. Thus, the first ratchet structure 251 can join the first fastener 250 of the first zip-tie 200 and the second fastener 450 of the second zip-tie 400.

Figure 9A:
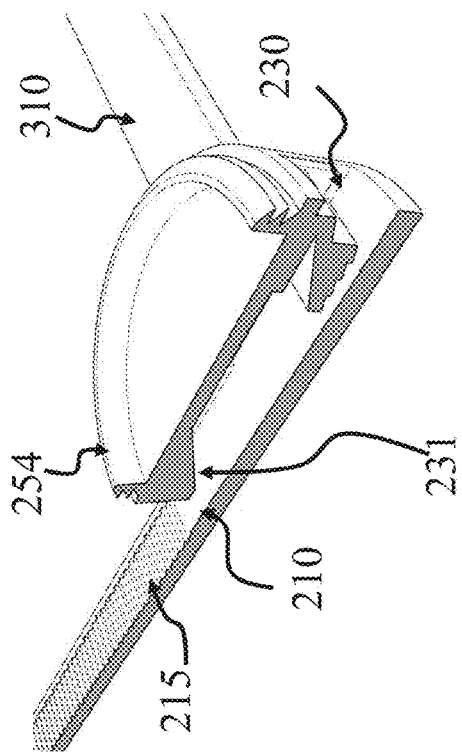
FIGS. 9(a) and 9(b) are cross-sectional views taken along line A-A' in FIG. 8(c), of a first fastener, according to one embodiment of the subject invention.
Figure 11A:
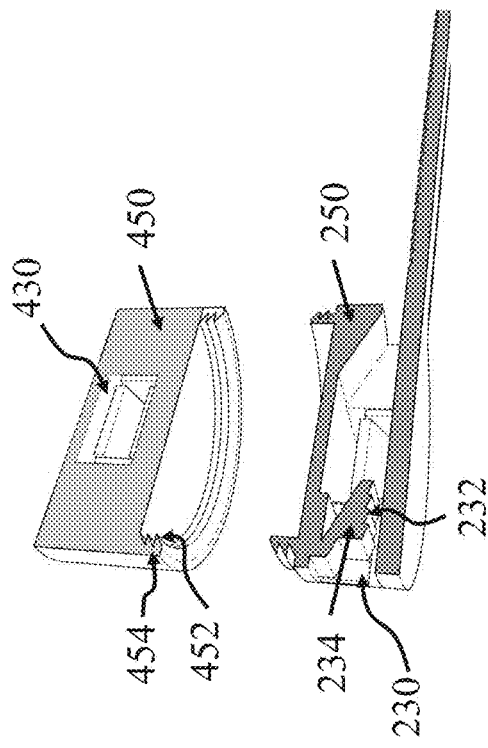
FIGS. 11(a) and 11(b) are cross-sectional perspective views, taken along line C-C' in FIG. 8(c), of a first zip-tie and a second fastener, according to one embodiment of the subject invention.
Figure 11B:
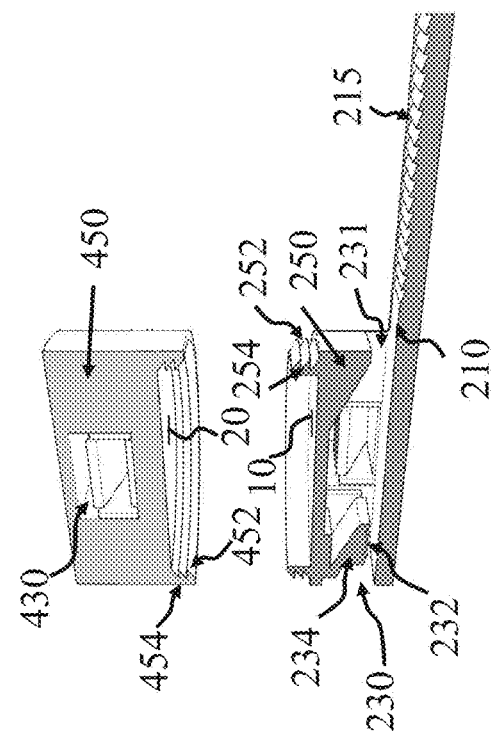

In a further embodiment, the first ratchet structure has a circular configuration, such that the first pawl 254 and the second pawl 454 form circular walls, as shown, by ways of non-limiting example, in FIGS. 9(a), 11(a), and 11(b). When the first engaging tooth 252 of the first pawl engages with the second engaging tooth 452 on the second pawl, there can be formed a first ratchet structure 251, about which the first fastener and the second fastener can rotate relative to each other. Advantageously, any straps integral (or monolithic) or engaged with the first fastener and the second fastener can be rotated to a desired position for attachment to one or more materials.

FIG. 1 is a perspective view of a multi-direction zip-tie according to an embodiment of the subject invention. Referring again to FIG. 1, it can be seen that the zip-tie can include a first zip-tie 200 and second zip-tie 400. The first zip-tie 200 can include a first fastener 250, a first strap 210, and a third strap 310. The second zip-tie 400 can include a second fastener 450 and a second strap 410. In a particular embodiment, the second fastener 450 and the second strap 410 are combined by a head 470, to which is connected the second strap 410. As shown in FIG. 1, the multi-direction zip-tie 100 can include three straps including the first strap 210, the second strap 410, and the third strap 310. However, alternative embodiments can have a different number of straps. Thus, the subject invention is not limited to a particular number of the straps.

Figures 3A, 3B:
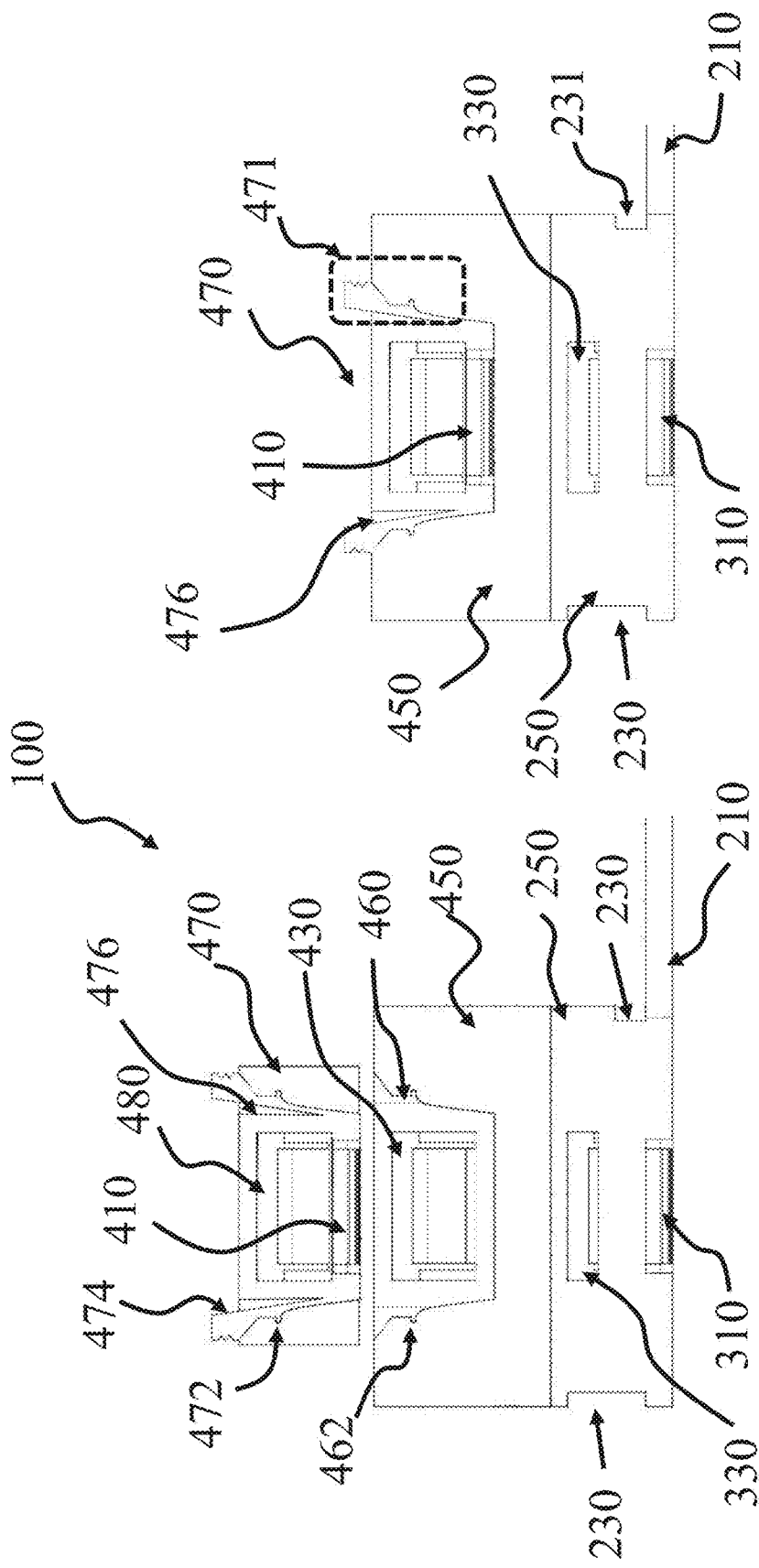
FIGS. 3(a) and 3(b) are front elevation views of a multi-direction zip-tie, according to one embodiment of the subject invention.
Figures 4A, 4B, 4C:
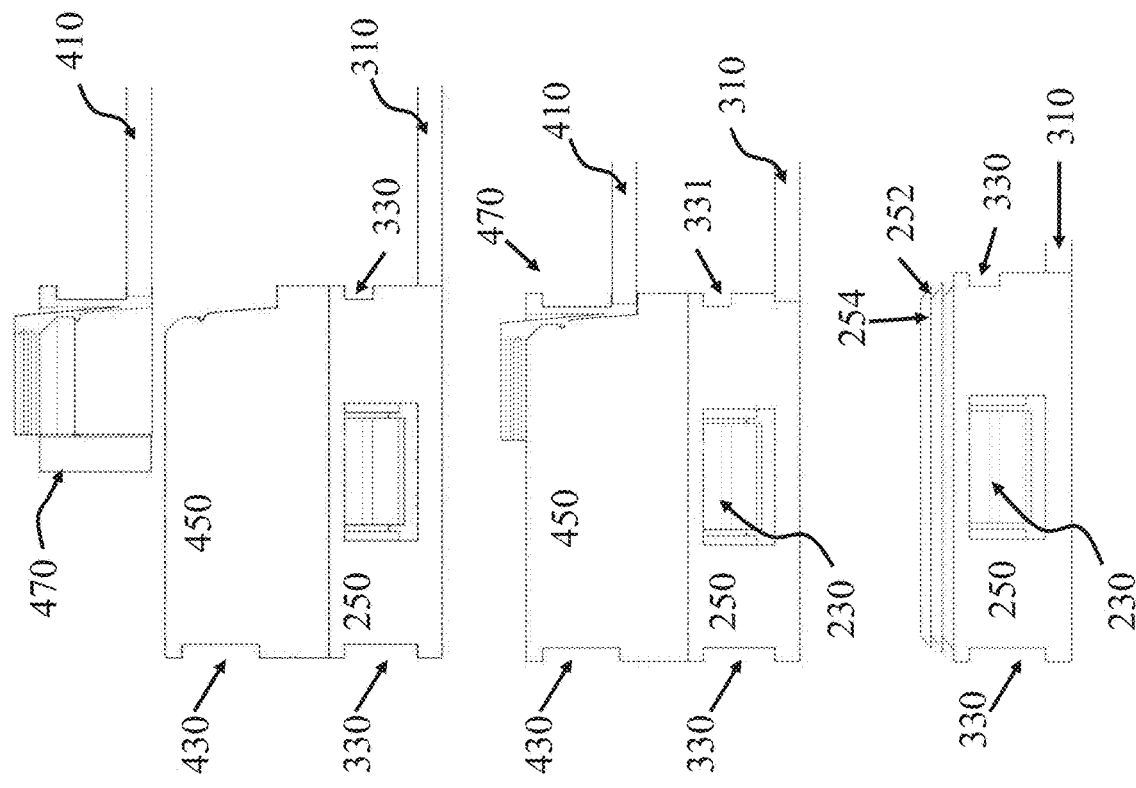
FIGS. 4(a)-4(c) are left side elevation views of a multi-direction zip-tie, according to one embodiment of the subject invention.
Figure 5:
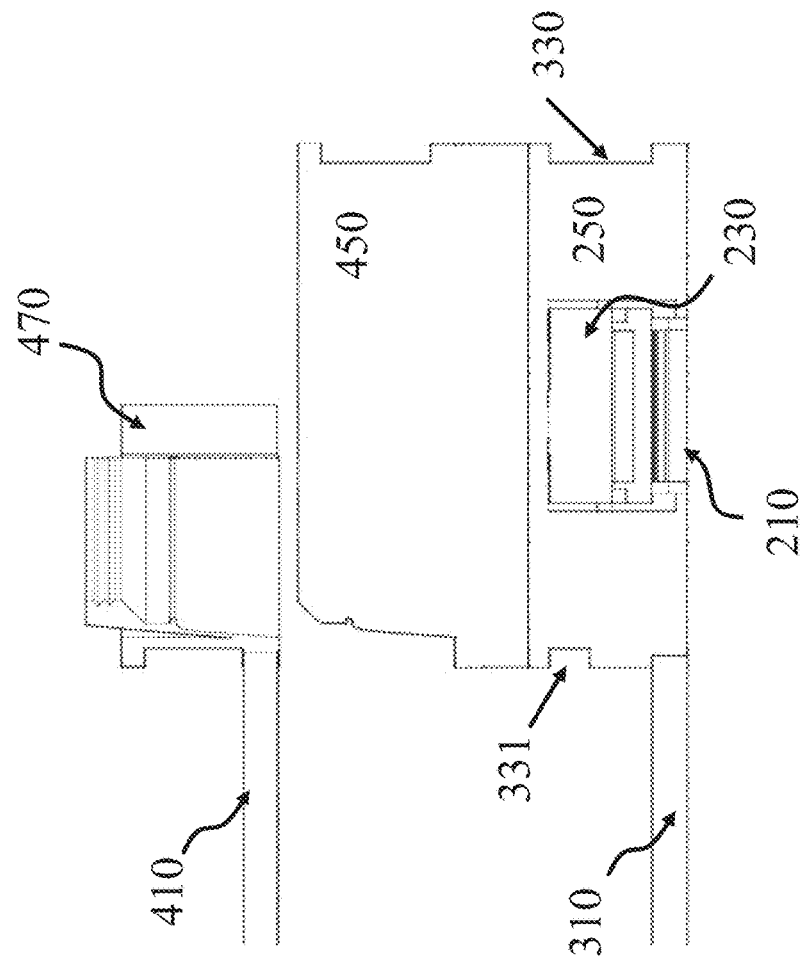
FIG. 5 is a right side elevation view of a multi-direction zip-tie, according to one embodiment of the subject invention. This view shows the head unattached to the second fastener.

FIGS. 3(a) and 3(b) show front views of an embodiment of the multi-direction zip-tie 100, FIGS. 4(a)-4(c) show left views of an embodiment of the multi-direction zip-tie 100, and FIG. 5 shows a right view of an embodiment of the multi-direction zip-tie 100. With reference to these figures, it can be seen in FIGS. 3(a)-5(b) that the third strap 310 can be located on a front side surface of the first fastener 250, and the first strap 210 can be located on a right side surface of the first fastener 250. In a further embodiment, a first channel 230 passes through the first fastener 250 from a left side surface to the right side surface, and a third channel 330 passes through the first fastener 250 from a back side surface to the front side surface; thus the first channel 230 has an exit 231 on the right side surface of the first fastener 250 and the third channel 330 has an exit 331 on the front side surface of the first fastener 250, as shown, for example, in FIG. 5.

In one embodiment, the second fastener 450 includes a groove 460 formed within the second fastener 450 and a second channel 430 passing through the second fastener 450 from within the groove 460 to the opposite side of the second fastener 450. The groove 460 includes a groove engaging tooth 462 that can engage with a head 470 having a head engaging tooth 472 and a head pawl 474, as shown, by way of non-limiting example, in FIG. 3(a). Thus, the head 470 and the second fastener 450 when assembled in the groove 460, by engaging the head engaging tooth 472 and the groove engaging tooth 462, form a second ratchet structure 471 on either side of the head, as shown, for example, in FIG. 3(b). The head pawls, each with the head engaging tooth thereon, are biased away from the head, such that there is formed a flexure space 476 between the head 470 and a head pawl 474, which is shown, by way of example, in FIGS. 1, 3(a) and 3(b). In addition, the head pawl 474 can be flexible with respect to the head 470. In one embodiment, the head pawl allows for detachment of the head 470 from the second fastener 450 by providing a simultaneous force against both head pawls 474 that moves the head pawls across the flexure spaces 476 and disengages the second ratchet structure 471. In a further embodiment, the head 470 includes a head channel 480, such that when the head 470 and the second fastener 450 are engaged, the head channel 480 and the second channel 430 are aligned with each other to form a contiguous channel through the head and the second fastener, which is illustrated in the example in FIGS. 13(a) and 13(b).

FIG. 6(a) shows a top view of the multi-direction zip-tie 100 and FIG. 6(b) shows a bottom view of the multi-direction zip-tie 100. Referring to FIGS. 6(a) and 6(b), it can be seen that in this embodiment, there is a first ridge 215 formed on a top surface 10 of the first strap 210 and a third ridge 315 formed on a bottom surface 20 of the third strap 310. The first ridge 215 can comprise one or more angled teeth 216 that can engage with structures in the first channel to secure the strap. Likewise, the third ridge 315 can comprises one or more angled teeth 316 that can engage with structures in the third channel 330 to secure the third strap 310. The second fastener 450 can have a top surface 10 and the first fastener 250 can have a bottom surface 20. In a specific embodiment, the top and bottom surfaces of the second and first fasteners, respectively, can have a circular shape, such that the first fastener 250 and the second fastener 450 form a cylindrical or barrel shape, as illustrated, for example, in FIGS. 7(a)-7(c). Alternatively, the first fastener and the second fastener can have non-circular circumferential shapes 600, which can facilitate grasping for rotation about the first ratchet structure 251, as described above. The ability of the first and second fasteners to rotate relative to each other is facilitated by the engagement of the first pawl 254 with the second pawl 454, which form a sort of rotation joint. Thus, the outward or circumferential shape 600 of the first fastener and second fastener is not limited to any particular form or shape, as long as such shape does not inhibit rotation. FIG. 2(b) illustrates a non-limiting example of a first fastener having one circumferential shape and the second fastener having a different circumferential shape. A person with skill in the art can determine other circumferential shapes for each of the fasteners, which can be the same or of different shapes.

Figure 7A:
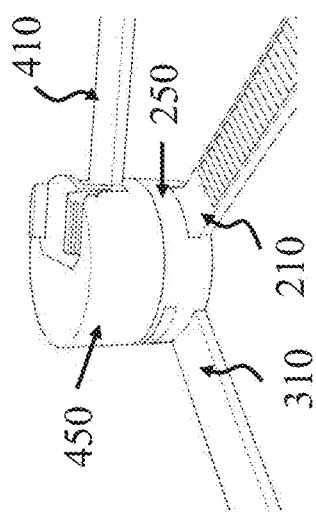
FIGS. 7(a)-7(c) are perspective views of a multi-direction zip-tie, according to one embodiment of the subject invention, showing a rotating second fastener.
Figure 7B:
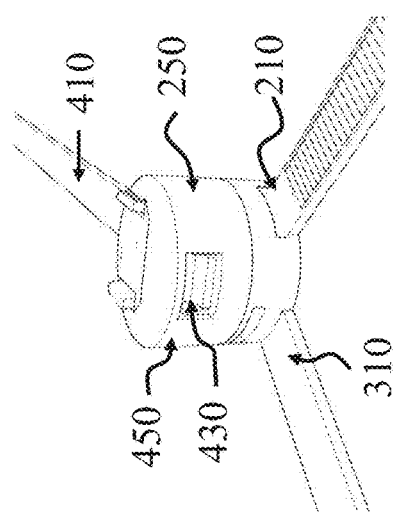
Figure 7C:
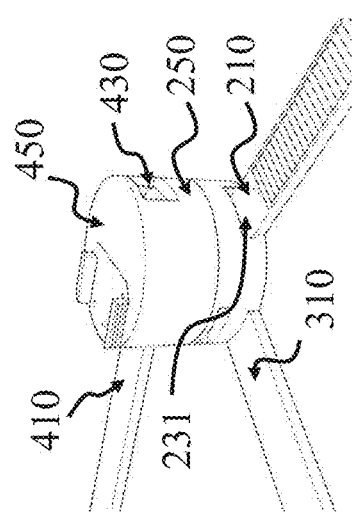

FIGS. 7(a)-7(c) show an embodiment of a second fastener 450 rotating on a first fastener, via the first ratchet structure. As discussed above, the first fastener 250 and the second fastener 450 can be engaged by their pawls 254 and 454, respectively, which form a first ratchet structure 251 (not seen). The first ratchet structure can have a circular configuration that allows the first fastener and second fastener to rotate relative to each other. Therefore, while the second fastener 450 remains in a secure engagement with the first fastener 250, the second fastener 450 can rotate up to 360°, in either direction with respect to the first fastener 250. Referring to FIGS. 7(a)-(c), the second fastener 450 is shown in rotated 180° (FIG. 7(c)) from an original position (FIG. 7(a)). However, the second fastener could rotate more or less than 180° and up to 360°. As a result, the second strap 410 integral (or monolithic) therewith also rotates with the second fastener, allowing the second fastener 450 to connect any target objects in any direction.

Figure 8A:
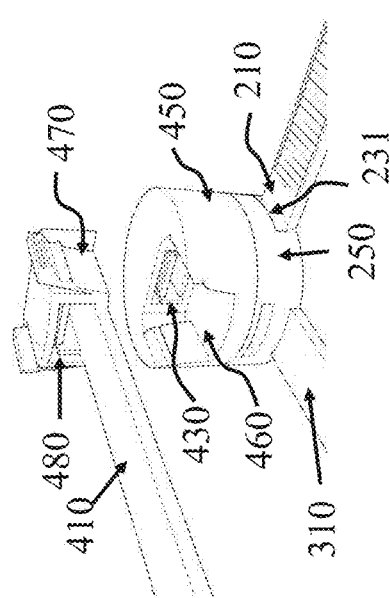
FIGS. 8(a)-8(c) are perspective views of a multi-direction zip-tie, according to one embodiment of the subject invention, showing a rotating second fastener with a detached second strap.
Figure 8B:
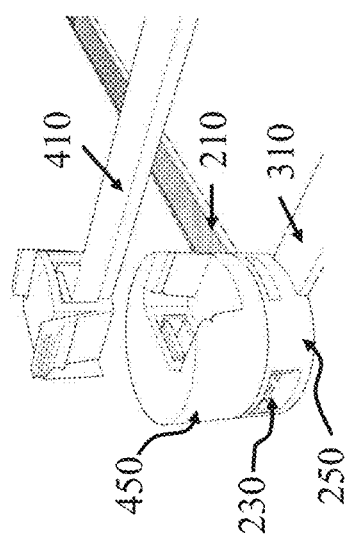
Figure 8C:
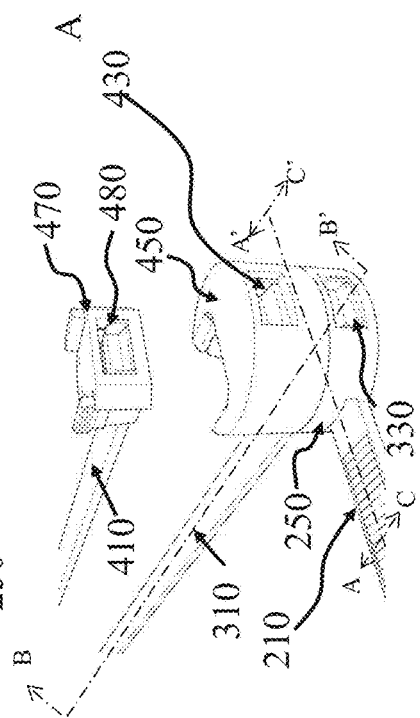

FIGS. 8(a)-8(c) show perspective views of an embodiment of a multi-direction zip-tie 100 with the head 470 detached with the second strap 410. This allows the second strap 410 to be interchangeable on the second fastener 450. The head 470 of the second strap 410 can be configured to be engaged with the groove 460 of the second fastener 450. In one embodiment, the head channel 480 that traverses through the head 470 and the second channel 430 of the second fastener 450 are configured to be aligned when the head is engaged in the groove, which is shown, by way of example, in FIGS. 8(a)-8(c). In one embodiment, the lengths of the first strap 210, the second strap 410, and the third strap 310 are same. In an alternative embodiment, one or more of the straps has a different length than one or more other straps. Ideally, there can be a variety of second straps 410 having different lengths, such that it is possible to replace the second straps 410 based on the required length.

Figure 9B:
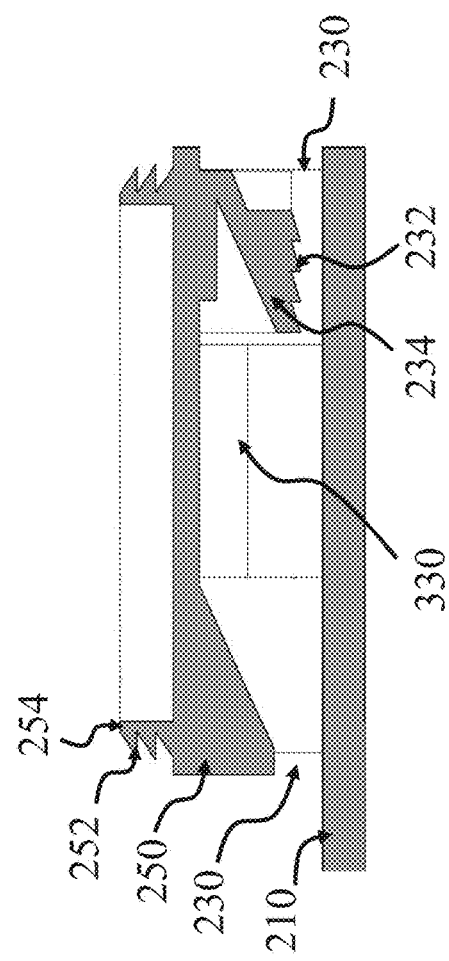
Figure 10:
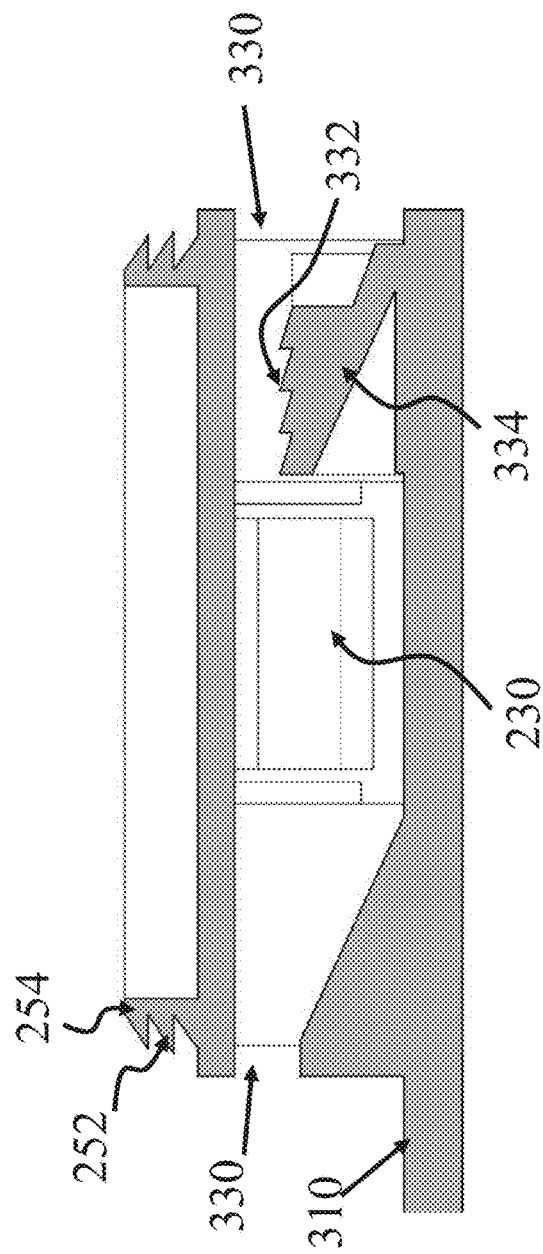
FIG. 10 is a cross-sectional view taken along line B-B' in FIG. 8(c), of a first fastener of a multi-direction zip-tie, according to one embodiment of the subject invention.

FIGS. 9(a) and 9(b) show cross-sectional views taken along line A-A' in FIG. 8(c) of an embodiment of a first fastener 250, and FIG. 10 shows a cross-sectional view, taken along line B-B' in FIG. 8(c), of an embodiment of a first fastener 250. The first fastener 250 can include a first channel 230 passing through the first fastener 250 to have an exit 231 on the opposite side of the first fastener. The first fastener 250 can also include a first channel engaging tooth 232 and a first channel pawl 234 located in the first channel 230. In a particular embodiment, the direction of the first channel 230 is linearly aligned with or in the same direction of the first strap 210. Thus, the first strap 210 can be inserted into the first channel 230, such that the first ridge 215 located on the first strap 210 can be engaged with the first channel pawl and the first channel engaging tooth 232 thereon.

In a further embodiment, the first fastener 250 has a third channel 330 in which there is a third channel engaging tooth 332 on a third channel pawl 334, as shown in the example in FIG. 10. The direction of the third channel 330 corresponds to the direction of the third strap 310, such that the third channel and the third strap are linearly aligned. Thus, the third strap 310, being integral (or monolithic) with the first fastener, can be inserted into the third channel 330, such that the angled teeth 316 on the third ridge 315 on the third strap 310 engage with the third channel pawl and the third channel engaging tooth 332 thereon. In one embodiment, the linear direction of the first channel 230 and the linear direction of the third channel 330 cause them to cross each other perpendicularly within the first fastener. FIGS. 9(b) and 10 illustrate this embodiment. In an alternative embodiment, the first channel and the second channel cross non-perpendicularly. In yet another embodiment, the first channel and the second channel do not cross each other.

FIGS. 11(a) and 11(b) are cross-sectional perspective views taken along line C-C' in FIG. 8(c), showing the separated first fastener 250 and second fastener 450. Referring to FIGS. 11(a) and 11(b), the first fastener 250 can have the first engaging tooth 252 and the first pawl 254 on a top surface 10, and the second fastener 450 has the second engaging tooth 452 and the second pawl 454 on a bottom surface 20. It can be seen that in this embodiment, the first pawl and the second pawl are circular, so that when the engaging teeth on each pawl are engaged, the fasteners can rotate relative to each other.

Figure 12A:
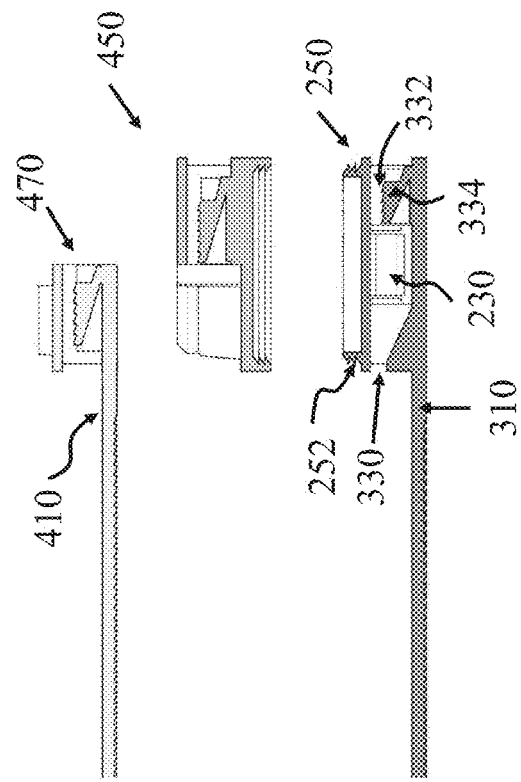
FIGS. 12(a) and 12(b) are cross-sectional views, taken along line B-B' in FIG. 8(c), of a multi-direction zip-tie, according to one embodiment of the subject invention.
Figure 12B:
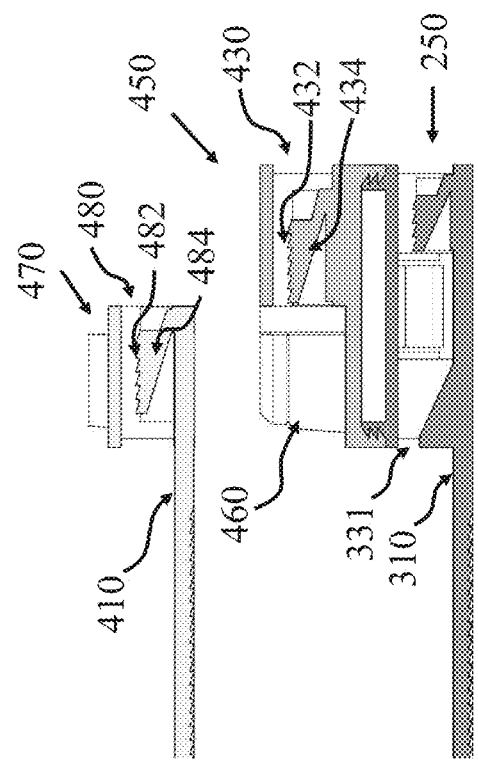
Figure 13A:
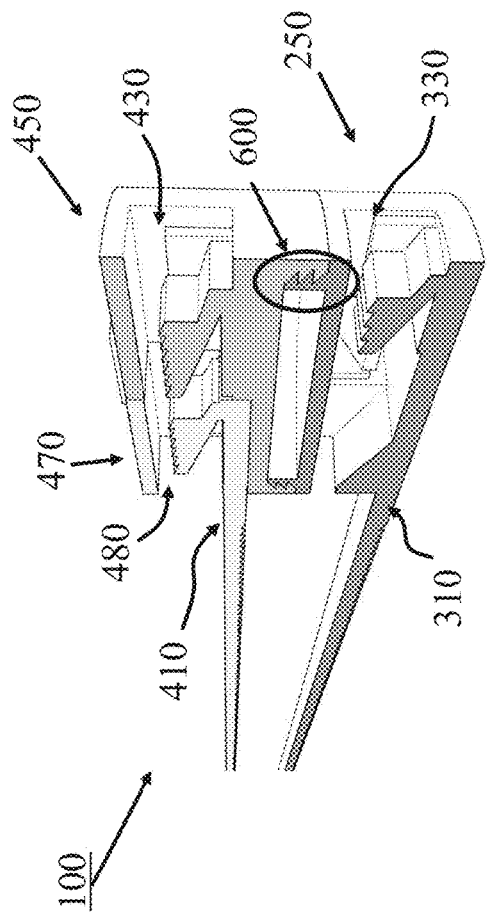
FIGS. 13(a) and 13(b) are cross-sectional views, taken along line B-B' in FIG. 8(c), of a multi-direction zip-tie, according to one embodiment of the subject invention, when a second strap and head are assembled on the first fastener.
Figure 13B:
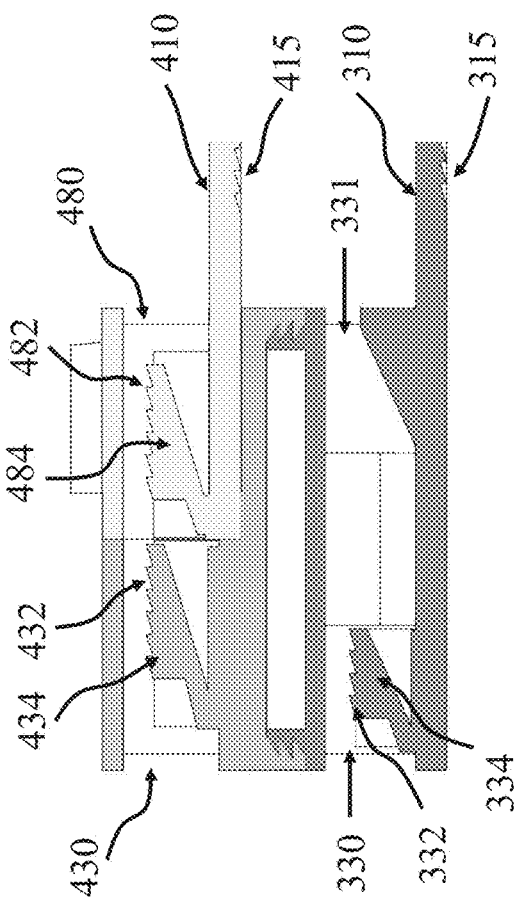

FIGS. 12(a) and 12(b) are cross-sectional views of the multi-direction zip-tie 100, taken along line B-B' in FIG. 8(c). FIGS. 13(a) and 13(b) are cross-sectional views of the multi-direction zip-tie 100, taken along line C-C' in FIG. 8(c). Referring to FIG. 12(b), the second fastener 450 includes a second channel 430 with a second channel engaging tooth 432 and a second channel pawl 434. The head 470, which can be engaged within the groove 460 of the second strap 410, includes a head channel engaging tooth 482 and a head channel pawl 484 in the head channel 480. In one embodiment, when the head 470 is engaged in the groove 460 of the second fastener 450, the second channel 430 and the head channel 480 are linearly aligned with the second strap 410. Thus, the second strap 410 can be inserted into and through the second channel 430 and the head channel 480, and a second ridge 415 formed on a bottom surface 20 of the second strap 410 can be engaged with the second channel engaging tooth 432 and the head channel engaging tooth 482. In a further embodiment, the second channel engaging tooth 432 and the head channel engaging tooth 482 are faced in the same direction, such that both teeth can engage with the second ridge 415 on the second strap.

Figure 14:
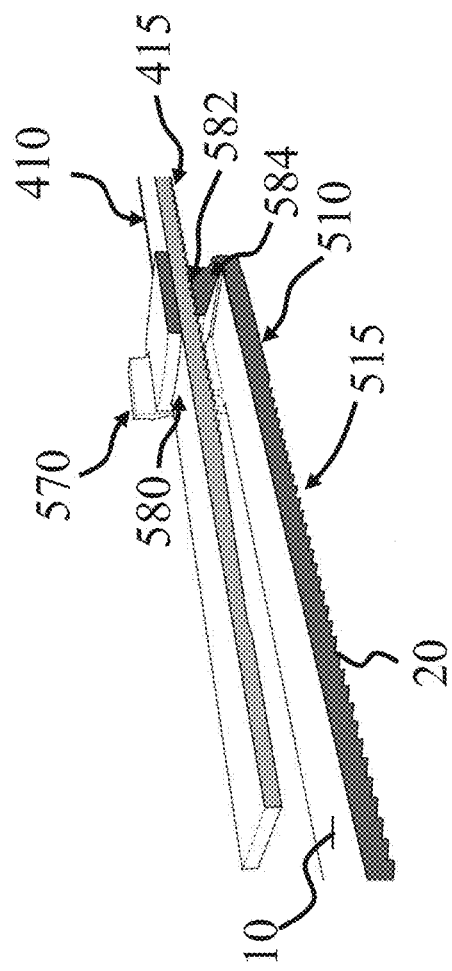
FIG. 14 is a cross-sectional perspective view, taken along line B-B' in FIG. 8(c) of an extension strap, according to one embodiment of the subject invention.

FIG. 14 shows a cross-sectional perspective view of one embodiment of an extension strap that is operably connected to a second strap 410 on a second zip-tie 400. In one embodiment, an extension strap 510 has an extension head 570 and an extension ridge 515 formed on a bottom surface 20 of the extension strap 510. The extension head 570 can have an extension channel 580 therethrough and linearly aligned with the extension strap. In one embodiment, the extension channel in the extension head 570 includes an extension channel engaging tooth 582 and an extension channel pawl 584 in the extension channel 580. In a further embodiment, the extension strap 510 is engaged with the second strap 410 by insertion of the second strap 410 into the extension channel 580, such that the second ridge 415 of the second strap 410 engages with the extension channel engaging tooth 582.

In a particular embodiment, the extension head 570 is configured similarly to a head 470 of the second strap 410. Thus, the extension head 570 can be engaged with the groove 460 of the second fastener 450. This can provide the advantage of using an extension strap as an alternative to a second strap. In an alternative embodiment, the extension head 570 of the extension strap 510 can be engaged with the first strap 210 or the third strap 310, such that the extension strap 510 can be engaged with the first channel 230, the second channel 430, the third channel 330, or the head channel 480.

Figure 15:
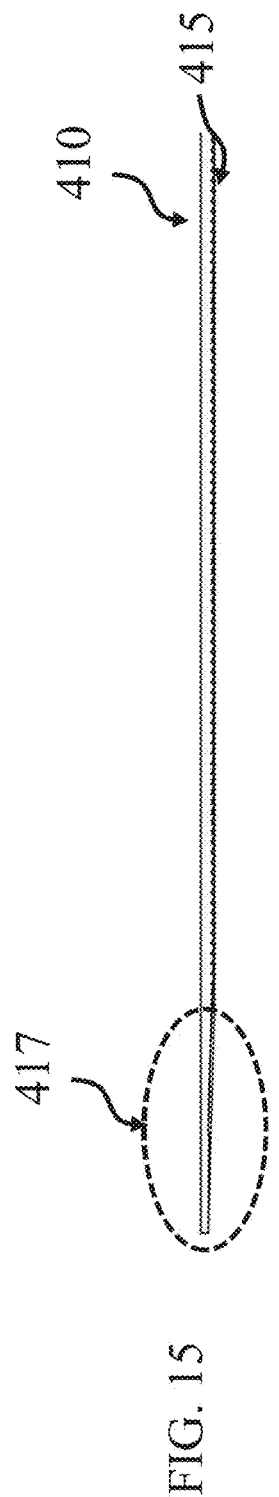
FIG. 15 is a partial view of a tail portion of a second strap, according to one embodiment of the subject invention.

FIG. 15 shows a tail portion of the second strap 410. In one embodiment, the tail portion 417 does not have a second ridge 415 and is thinner than a thickness at a middle portion of the second strap 410 having the second ridge 415. The first strap 210, the third strap 310, and the extension strap 510 may have a tail portion similar to the tail portion 417 of the second strap 410, respectively. The thinner tail portion, without the second ridge, can be easier to insert into one of the channels in the fastener embodiments of the subject invention.

The multi-direction zip-tie 100 can also be made of a luminescent material, thereby helping a person find the multi-direction zip-tie 100 in a dark environment. Further, the first strap 210, the second strap 410, the third strap 310, and the extension strap 510 can be made of a sufficiently flexible material, thereby making it easier to wind around a target object.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

EXAMPLE 1—Multi-Direction Zip-Tie for Connecting Multiple Materials

A multi-direction zip-tie was fabricated that can include a first fastener, a second fastener configured to be combined with the first fastener via a first ratchet structure, a first strap formed on a right side surface of the first fastener, a second strap connected to the second fastener, a third strap formed on a front side surface of the first fastener, and an extension strap combined with the second strap.

Figure 16A:
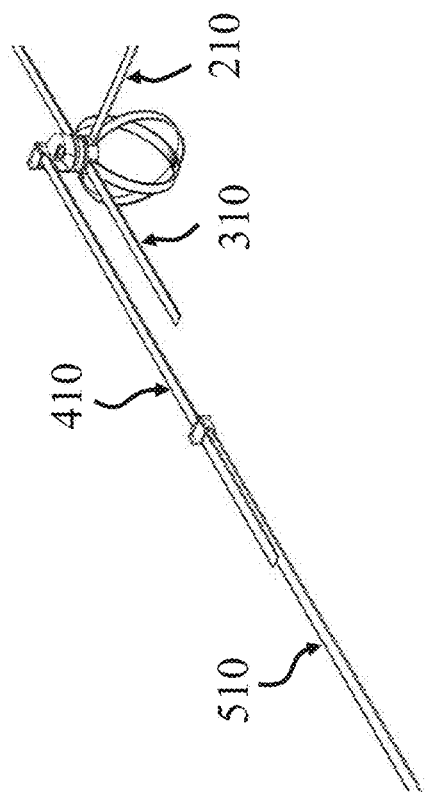
FIGS. 16(a) and 16(b) illustrate a multi-direction zip-tie, according to an embodiment of the subject invention.
Figure 16B:
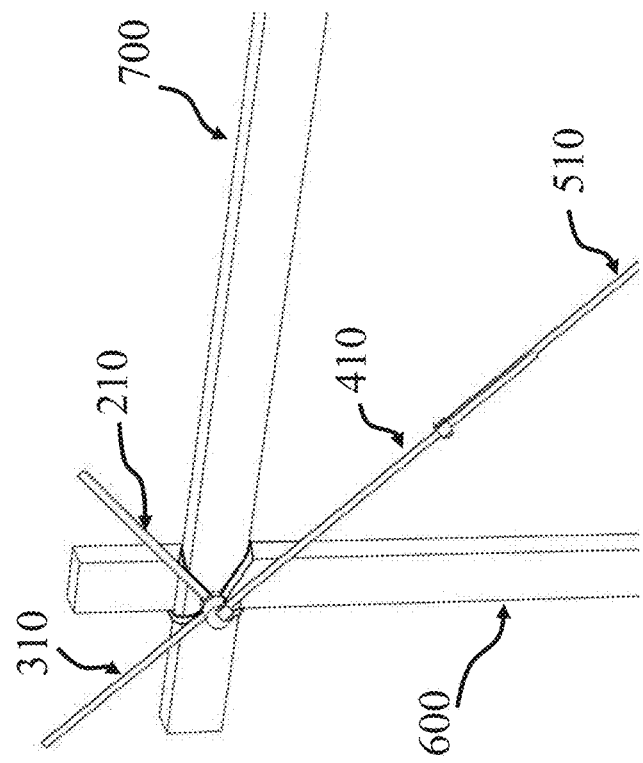

Referring to FIGS. 16(a) and 16(b), the first strap 210 and the third strap 310 tightly fasten a first support 600 and a second support 700 such that the first support 600 and the second support 700 make a perpendicular degree. In addition, the second strap 410 and the extension strap 510 can be rotated and extended to any direction in order to be combined with other zip-ties.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A multi-direction zip-tie, comprising:
   a first zip-tie comprising a first fastener and a first strap; and
   a second zip-tie comprising a second fastener and a second-strap,
   wherein the first fastener and the second fastener are configured to be combined with each other,
   wherein the first fastener comprises a first pawl and a first engaging tooth, and the second fastener comprises a second pawl and a second engaging tooth,
   wherein the first engaging tooth and the second engaging tooth are securely engaged with each other, and
   wherein the second fastener is rotatable with respect to the first fastener about a rotation axis, the first and second straps extending perpendicular to the rotation axis.

2. The multi-direction zip-tie according to claim 1, wherein each of the first fastener and the second fastener has a cylindrical circumferential shape.

3. A multi-direction zip-tie, comprising:
   a first zip-tie comprising a first fastener and a first strap;
   a second zip-tie comprising a second fastener and a second strap; and
   a third strap monolithically formed with the first zip-tie,
   wherein the first fastener and the second fastener are configured to be combined with each other.

4. The multi-direction zip-tie according to claim 3, wherein the second fastener comprises a groove and the second strap comprises a head, wherein the head and the groove are configured to be combined with each other.

5. The multi-direction zip-tie according to claim 4, wherein the first fastener comprises a first channel that passes through the first fastener in a first direction aligned with the first strap.

6. The multi-direction zip-tie according to claim 4, wherein the second fastener comprises a second channel that passes through the second fastener and the groove in a second direction aligned with the second strap.

7. The multi-direction zip-tie according to claim 6, wherein the head comprises a head channel configured to be contiguous with the second channel of the second fastener, when the head is in the groove on the second fastener.

8. The multi-direction zip-tie according to claim 4, wherein the first fastener comprises a third channel that passes through the first fastener in a third direction aligned with the third strap.

9. The multi-direction zip-tie according to claim 4, further comprising an extension strap configured to be combined with at least one of the first strap, the second strap, and the third strap.

10. The multi-direction zip-tie according to claim 9, wherein the extension strap comprises an extension head that fastens to at least one of the first strap, the second strap, and the third strap.

11. The multi-direction zip-tie according to claim 3, wherein at least one of the first zip-tie and the second zip-tie comprises a luminescent material.

12. The multi-direction zip-tie according to claim 3, wherein the first strap comprises a first ridge on a top surface of the first strap, the second strap comprises a second ridge on a bottom surface of the second strap, and the third strap comprises a third ridge on a bottom surface of the third strap.

13. A multi-direction zip-tie, comprising:
   a first fastener;
   a second fastener configured to be combined with the first fastener via a first ratchet structure;
   a first strap formed on a right side surface of the first fastener;
   a second strap connected to the second fastener; and
   a third strap formed on a front side surface of the first fastener.

14. The multi-direction zip-tie according to claim 13, wherein the first strap, the second strap, and the third strap are made of a flexible material.

15. The multi-direction zip-tie according to claim 13, wherein the first strap and the third strap are monolithically formed with the first fastener.

16. The multi-direction zip-tie according to claim 13, wherein the first fastener comprises a first channel corresponding to the first strap and a third channel corresponding to the third strap, and the second fastener comprises a second channel corresponding to the second strap.

* * * * *